UNITED STATES PATENT OFFICE.

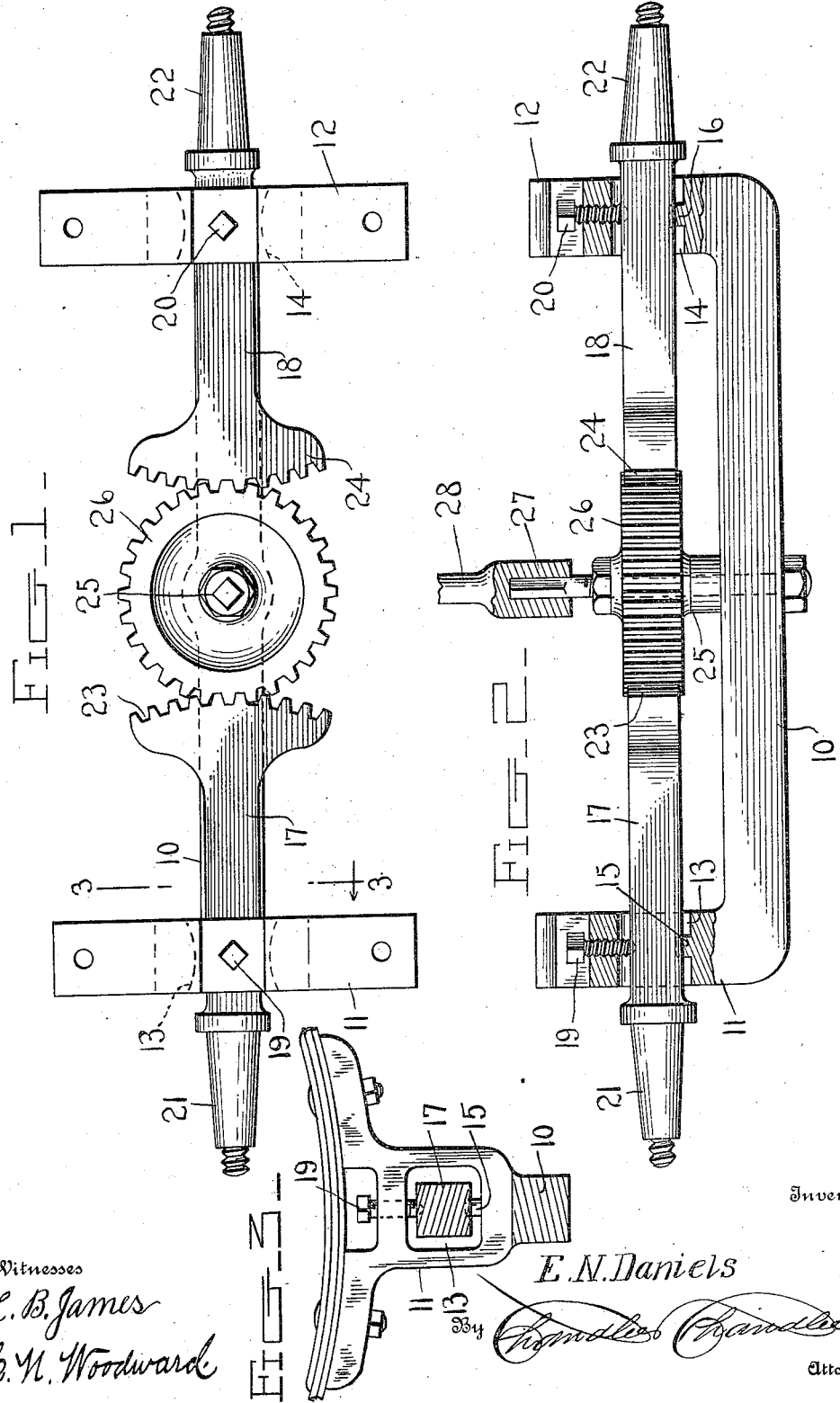

EUGENE N. DANIELS, OF LA FARGEVILLE, NEW YORK.

STEERING-GEAR FOR VEHICLES.

934,144.  Specification of Letters Patent.  Patented Sept. 14, 1909.

Application filed June 12, 1908. Serial No. 438,228.

*To all whom it may concern:*

Be it known that I, EUGENE N. DANIELS, a citizen of the United States, residing at La Fargeville, in the county of Jefferson, State of New York, have invented certain new and useful Improvements in Steering-Gear for Vehicles; and I do hereby declare the following to be a full, clear, and exact description of the invention, such as will enable others skilled in the art to which it appertains to make and use the same.

This invention relates to steering gear for vehicles, and has for one of its objects to provide a simply constructed device of this character which may be readily applied to vehicles of various kinds including ordinary wagons and carriages and also to motor vehicles, and the like.

With these and other objects in view the invention consists in a supporting member having the ends extended at right angles and apertured to receive the parts of a divided axle, the axle members arranged to swing horizontally within the apertures and provided with gear segments at the inner ends adapted to be engaged by a gear wheel mounted for rotation upon the supporting member, the gear having operating means applied thereto.

The invention further consists in certain novel features of construction as hereafter shown and described and then specifically pointed out in the claims, and in the drawings illustrating the preferred embodiment of the invention, Figure 1 is a plan view of the improved device as applied to an automobile or similar vehicle. Fig. 2 is a front elevation of the parts shown in Fig. 1, partly in section. Fig. 3 is a section enlarged on the line 3—3 of Fig. 1.

The improved device comprises a base member or bar 10 having the ends 11—12 extending at right angles thereto and formed with transverse apertures 13—14, the apertures having studs 15—16, as shown.

A divided axle forms a part of the improved device, the two parts of the axle represented at 17—18 and extending respectively through the apertures 13—14 and having sockets engaging the studs 15—16, and thereby arranged for oscillation.

Set screws 19—20 are tapped through the ends 11—12 of the member 10 and bear against the axle members, and prevent them from becoming displaced from the studs.

The axle members are provided at their outer ends with journals 21—22 and at their inner ends with gear segments 23—24.

Mounted for rotation at 25 upon the member 10 is a gear wheel 26 meshing with the gear segments 23—24.

When the device is employed upon an automobile or like vehicle, the journal 25 of the wheel 26 is extended into a head 27 to receive a steering rod 28, as shown in Figs. 1 and 2, and when the device is employed upon an ordinary vehicle, the draft tongue or the thills of the vehicle will be coupled to the member 10, but as this coupling means forms no part of the invention it is not shown.

The improved device is simple in construction, may be applied to any of the various forms of automobiles or motor cars, or to vehicles of various kinds without material structural changes, is very strong and durable, and easily operated.

What is claimed, is:—

1. In a steering gear for vehicles, a supporting member having the ends directed upwardly and provided with transverse apertures, each aperture having an internal stud, a divided axle with the parts extending respectively through said apertures and swinging upon said studs, the inner ends of the axle members having gear segments, a gear wheel supported for rotation upon said supporting member and engaging said segments, and means for oscillating said gear wheel.

2. In a steering gear for vehicles, a supporting member having the ends directed upwardly and provided with transverse apertures, each aperture having an internal stud, a divided axle with the parts extending respectively through said apertures and swingingly engaging said studs, set screws operating through said upwardly directed ends and bearing upon the axle within the apertures, the inner ends of the axle members having gear segments, a gear wheel mounted for rotation upon said supporting member and engaging said segments, and means for oscillating said gear wheel.

In testimony whereof, I affix my signature, in presence of two witnesses.

EUGENE N. DANIELS.

Witnesses:
  FRANK A. HEYL,
  JOHN W. CARPENTER.